United States Patent
Lee et al.

(10) Patent No.: US 12,544,695 B2
(45) Date of Patent: Feb. 10, 2026

(54) DOUBLE FILTER STRUCTURE

(71) Applicant: NATIONAL INSTITUTE OF ECOLOGY, Seocheon-gun (KR)

(72) Inventors: Won Jun Lee, Gwangju (KR); Ji Yeong Kim, Gunsan-si (KR); Ki Dong Kim, Guri-si (KR); Hae Jin Bae, Gunsan-si (KR); Saeromi Mun, Gunsan-si (KR)

(73) Assignee: NATIONAL INSTITUTE OF ECOLOGY, Seocheon-gun (KR)

( * ) Notice: Subject to any disclaimer, the term of this patent is extended or adjusted under 35 U.S.C. 154(b) by 378 days.

(21) Appl. No.: 18/334,543

(22) Filed: Jun. 14, 2023

(65) Prior Publication Data

US 2024/0009604 A1    Jan. 11, 2024

(30) Foreign Application Priority Data

Jul. 8, 2022 (KR) .................. 10-2022-0084134

(51) Int. Cl.
*B01D 35/30* (2006.01)
*B01D 29/56* (2006.01)

(52) U.S. Cl.
CPC ............. *B01D 35/30* (2013.01); *B01D 29/56* (2013.01); *B01D 2201/31* (2013.01)

(58) Field of Classification Search
CPC ..... B01D 35/30; B01D 29/56; B01D 2201/31
See application file for complete search history.

(56) References Cited

U.S. PATENT DOCUMENTS 10,662,076 B2 *  5/2020  Cappadona ............. C02F 1/001

FOREIGN PATENT DOCUMENTS

| JP | 2021-178295 A | 11/2021 | |
|----|---------------|---------|---|
| KR | 10-2004-0019464 A | 3/2004 | |
| KR | 10-0491513 B1 | 5/2005 | |
| KR | 10-2010-0127132 A | 12/2010 | |
| KR | 10-1285605 B1 | 7/2013 | |
| KR | 10-2013-0104645 A | 9/2013 | |
| KR | 20130104645 A * | 9/2013 | ............. B05B 1/185 |
| KR | 10-1560173 B1 | 10/2015 | |
| KR | 10-2017-0024597 A | 3/2017 | |
| KR | 20-0490277 Y1 | 10/2019 | |
| KR | 10-2349534 B1 | 1/2022 | |
| KR | 10-2022-0090642 A | 6/2022 | |

* cited by examiner

*Primary Examiner* — Waqaas Ali

(57) ABSTRACT

According to various exemplary embodiments of the present disclosure, a double filter structure is applied to control a movement path of the fluid to be purified to efficiently utilize the filter unit and use different types of filter unit to increase the purification efficiency.

11 Claims, 8 Drawing Sheets

DOUBLE FILTER STRUCTURE

CROSS-REFERENCE TO RELATED APPLICATIONS

This application claims priority to and the benefit of Korean Patent Application No. 10-2022-0084134 filed in the Korean Intellectual Property Office on Jul. 8, 2022, the entire contents of which are incorporated herein by reference.

FIELD

Background

The present disclosure relates to a filter structure and more particularly to a double filter structure.

Description of the Related Art

The contents described in this section merely provide background information on the present exemplary embodiment but do not constitute the related art.

Generally, a filter structure is a device for purifying raw water such as tap water or mineral water or purifying air containing solid particles such as dust and removes heavy metals or other harmful substances contained in the fluid based on the water purification method including processes such as precipitation, filtration, and sterilization to provide a fluid containing only beneficial substances to the human body.

Such a filter structure includes various filters to purify the fluid so that in recent years, research on a filter structure having a miniaturized and compact design is being actively conducted, and research is also needed to minimize the hassle of filter replacement of filters with different exchange cycles included in the filter structure.

Further, research is required for the filter structure that can be applied to a slim water purification system with a miniaturized and compact design to obtain reliable water purification efficiency while reducing the length of the housing.

RELATED ART DOCUMENT

Patent Document (Patent Document 1) Korean Registered Patent No. 10-1560173 (Oct. 7, 2015)
(Patent Document 2) Korean Registered Patent No. 10-0491513 (May 17, 2005)

SUMMARY

An object to be achieved by the present disclosure is to provide a double filter structure which controls a movement path of fluid to be purified to efficiently utilize a filter unit, thereby increasing a purification efficiency.

An object to be achieved by the present disclosure is to provide a double filter structure which uses different types of filter units to increase a purification efficiency.

Other and further objects of the present disclosure which are not specifically described can be further considered within the scope easily deduced from the following detailed description and the effect.

In order to achieve the above-described objects, according to an aspect of the present disclosure, a double filter structure includes a housing unit which is provided to penetrate in a longitudinal direction to include an inner space; an inlet unit which is located at one side of the housing unit and provides an inflow path of the fluid; a first filter unit which sucks fluid introduced from the inflow path in the longitudinal direction and discharges the sucked fluid to the width direction; a second filter unit which sucks the discharged fluid in the width direction and discharges the fluid in the longitudinal direction; a partition which connects the first filter unit and the second filter unit; and an outlet unit which is located at the other side of the housing unit and provides an outflow path of the fluid discharged from the second filer unit.

Here, the partition is fixed to an inner circumferential surface of the housing unit to divide the inner space of the housing unit into a space in which the first filter unit is located and a space in which the second filter unit is located and at least one through hole is provided to provide a movement path through which the fluid discharged from the first filter unit is introduced into the second filter unit.

Here, the first filter unit and the second filter unit are provided with empty spaces therein to penetrate in the longitudinal direction.

Here, the partition includes a filter fixing protrusion which is provided to be fitted into the empty spaces provided in the first filter unit and the second filter unit to fix the first filter unit and the second filter unit to the partition. Here, the partition includes a plurality of through holes and the plurality of through holes is disposed to be spaced apart from each other along a circuit having a diameter which is larger than the filter fixing protrusion and smaller than the inner circumferential surface of the housing unit.

Here, the inlet unit includes a first path providing protrusion which is provided with an empty space therein to penetrate in the length direction to provide a path through which the fluid is introduced into the inner space of the first filter unit and at least partially fitted into the empty space provided in the first filter unit.

Here, the first path providing protrusion is provided to at least partially protrude outwardly from the housing unit. Here, the outlet unit includes a second path providing protrusion which is provided with an empty space therein to penetrate in the length direction to provide a path through which the fluid is leaked from the inner space of the second filter unit to the outside of the housing unit and is at least partially fitted into the empty space provided in the second filter unit.

Here, the second path providing protrusion is provided to at least partially protrude outwardly from the housing unit. Here, the partition includes a through hole cover which is provided to open and close the through hole.

Here, the through hole cover is provided to correspond to at least one through hole.

Here, the through hole cover is provided to be larger than the size of the through hole, is rotatably fixed to the partition, and rotates in a fixed position to open and close the through hole.

Here, the first filter unit and the second filter unit are any one of a HEPA filter, a ceramic filter, a nano-fiber filter, or a polymer filter.

Here, the housing unit is formed of a material of any one of a polymer compound or metal.

As described above, according to the exemplary embodiment of the present disclosure, a movement path of a fluid to be purified is controlled by applying a double filter structure to efficiently utilize the filter unit.

According to the exemplary embodiment of the present disclosure, different types of filter units are used by applying the double filter structure to increase the purification efficiency.

Even if the effects are not explicitly mentioned here, the effects described in the following specification which are expected by the technical features of the present disclosure and their potential effects are handled as described in the specification of the present disclosure.

DETAILED DESCRIPTION OF THE EMBODIMENT

Figure 1:
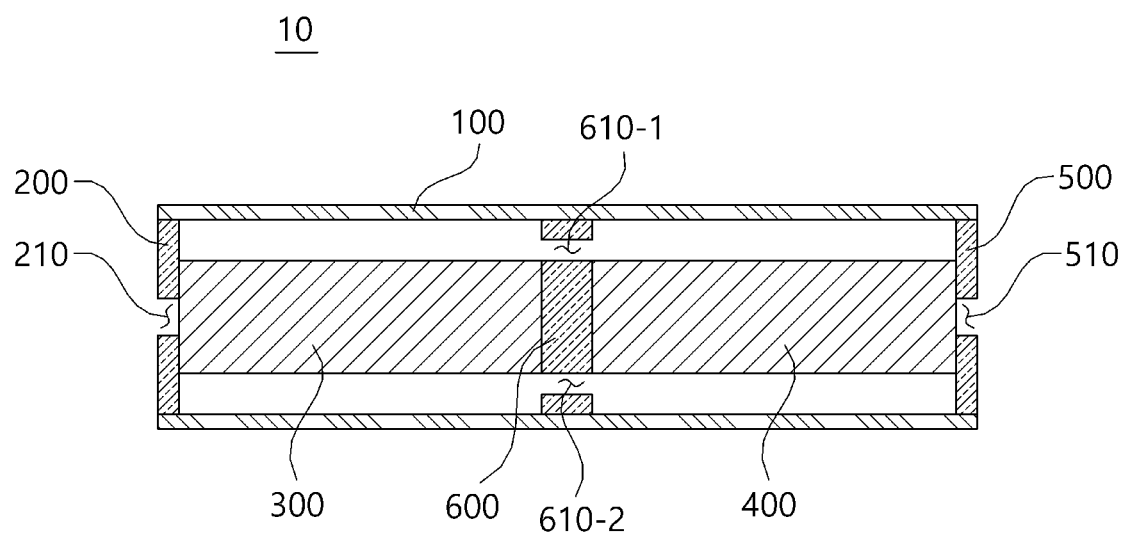
FIG. 1 is a diagram for explaining a configuration of a double filter structure according to an exemplary embodiment of the present disclosure.

Hereinafter, embodiments of the present disclosure will be described in detail with reference to the accompanying drawings. Advantages and characteristics of the present disclosure and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined. Terms used in the present application are just used to describe a specific exemplary embodiment and do not intend to limit the present invention and a singular expression may include a plural expression as long as it is not apparently contextually different. In the present application, it should be understood that term "have" "may have", "include" or "may include" indicates that a feature, a number, a step, an operation, a component, a part or a combination thereof described in the specification is present, but do not exclude a possibility of presence or addition of one or more other features, numbers, steps, operations, components, parts or combinations thereof, in advance. Terms including an ordinary number, such as first and second, are used for describing various constituent elements, but the constituent elements are not limited by the terms.

The above terms are used only to distinguish one component from the other component. For example, without departing from the scope of the present invention, a first component may be referred to as a second component, and similarly, a second component may be referred to as a first component. A term of and/or includes combination of a plurality of related elements or any one of the plurality of related elements.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

Hereinafter, various exemplary embodiments of a double filter structure according to the present disclosure will be described in detail with reference to the accompanying drawings.

Embodiments described in this specification can be used to be connected to water pipes for water and sewage treatment. To be more specific, the exemplary embodiments described in the present specification may be applied by putting a catalyst material or the like in accordance with the size to be implemented and being connected to a water supply pipe of a garbage landfill, a wastewater treatment plant, a polluted waterway, and a sewage treatment plant.

FIG. 1 is a diagram for explaining a configuration of a double filter structure according to an exemplary embodiment of the present disclosure.

Figure 2:
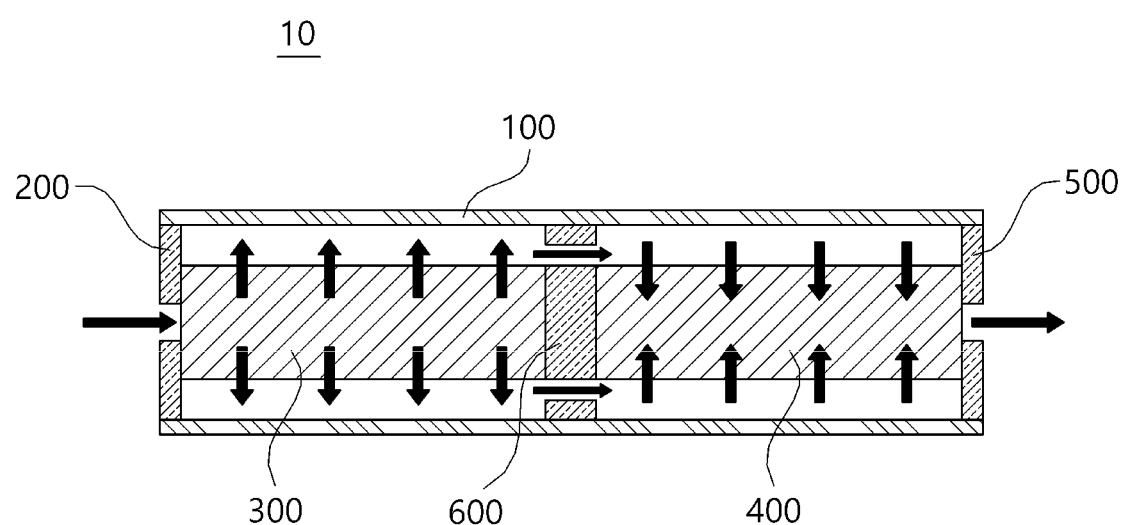
FIG. 2 is a view for explaining a flow of a fluid in a double filter structure of FIG. 1.

FIG. 2 is a view for explaining a flow of a fluid in a double filter structure of FIG. 1.

FIGS. 1 and 2 are views illustrating a cross-section which is horizontal to a length direction and is perpendicular to a width direction of the double filter structure according to an exemplary embodiment of the present disclosure.

In the present disclosure, the "length direction" is a "horizontal direction" with respect to FIG. 1 and the "width direction" is a "vertical direction" with respect to FIG. 1. Hereinafter, the exemplary embodiment will be described with respect to the defined direction.

Referring to FIG. 1, the double filter structure 10 includes a housing unit 100, an inlet unit 200, a first filter unit 300, a second filter unit 400, an outlet unit 500, and a partition 600.

The housing unit 100 is provided to penetrate in a longitudinal direction to include an inner space. The housing unit 100 may be integrally formed, but may be separated and reassembled to replace the inlet unit 200, the first filter unit 300, the second filter unit 400, and the outlet unit 500, and the partition 600 located in the inner space of the housing unit 100.

The housing unit 100 may have a cylindrical shape provided to penetrate in a longitudinal direction to include an inner space. The housing unit 110 may have an elliptical column shape or a rectangular parallelepiped shape. The housing unit 100 may have a shape in which the width becomes narrower or wider in the longitudinal direction. The housing unit 100 is also implemented to have a shape in which the width becomes narrower and then wider or wider and then narrower in the longitudinal direction.

The housing unit 100 may be formed with a material having a predetermined rigidity to prevent from being broken by a pressure of fluid therein or an external force supplied from the outside, such as a polymer compound (for example, plastic or acryl) or metal (for example, titanium) and also formed with a material which prevents corrosion or deterioration through use.

The inlet unit 200 is located at one side of the housing unit 100 and provides an inflow path of the fluid. A width of the inlet unit 200 is substantially equal to a width of one inner circumferential surface of the housing unit 100. The inlet unit 200 may be fitted into one inner circumferential surface of the housing unit 100.

The inflow path 210 may be provided to pass through the inlet unit 200 in the longitudinal direction.

Referring to FIG. 2, the fluid to be purified may be introduced into the double filter structure 10 through the inflow path 210 provided by the inlet unit 200.

The first filter unit 300 sucks the fluid introduced from the inflow path 210 provided by the inlet unit 200 and discharges the sucked fluid in the width direction.

Referring to FIG. 2, the fluid introduced through the inflow path 210 is sucked in the longitudinal direction of the first filter unit 300 and is discharged in the with direction to perform the primary purification.

The second filter unit 400 sucks the fluid discharged from the first filter unit 300 and discharges the fluid in the longitudinal direction.

Lengths and widths of the first filter unit 300 and the second filter unit 400 may be different from each other.

The first filter unit 300 and the second filter unit 400 may be various known types of filters, such as a sediment filter, a pre carbon filter, a post carbon filter, an UF filter, an RO filter, an ACF (activated carbon fiber) filter, an AC (activated carbon) filter, a membrane filter, a HEPA filter, a ceramic filter, a nano-fiber filter, or a polymer filter.

The partition 600 may connect the first filter unit 300 and the second filter unit 400. The partition 600 is fixed onto an inner circumferential surface of the housing unit 100 to divide the inner space of the housing unit 100 into a space in which the first filter unit 300 is located and a space in which the second filter unit 400 is located and at least one through hole 610 is provided to provide a movement path through which the fluid discharged from the first filter unit 300 is introduced into the second filter unit 400.

The partition 600 may be fitted onto the inner circumferential surface of the housing unit 100 and may be adhered by various known methods. The partition 600 may be located near the center in the longitudinal direction of the housing part 100. A width of the partition 600 may be substantially the same as the width of the inner circumferential surface of the center portion of the housing unit 100 to which the partition 600 is fixed.

The through hole 610 may be provided so as to penetrate the partition 600 in the longitudinal direction. To be more specific, the through hole 610 may provide a movement path of the fluid between the space in which the first filter unit 300 is located and the space in which the second filter unit 400 is located.

Referring to FIG. 2, the fluid discharged in the width direction of the first filter unit 300 may move to the space in which the second filter unit 400 is located along the through holes 610-1 and 610-2 which are provided by the partition 600. Next, the fluid is sucked in the width direction of the second filter unit 400. As the fluid sucked in the width direction of the second filter unit 400 is discharged in the longitudinal direction of the second filter unit 400, secondary purification is performed.

The outlet unit 500 is located at the other side of the housing unit 100 and provides an outflow path 510 of the fluid discharged from the second filter unit 400. A width of the outlet unit 500 is substantially equal to a width of the other inner circumferential surface of the housing unit 100. The outlet unit 500 may be fitted into the other inner circumferential surface of the housing unit 100.

The outflow path 510 may be provided so as to penetrate the outlet unit 500 in the longitudinal direction. The inlet unit 200, the outlet unit 500, and the partition 600 may be formed with a material having a predetermined rigidity to prevent from being broken by a pressure of fluid therein or an external force supplied from the outside, such as a polymer compound (for example, plastic or acryl) or metal (for example, titanium) and also formed with a material which is not corroded or degraded through use.

Referring to FIG. 2, the fluid discharged from the second filter unit 400 may be leaked to the outside of the double filter structure 10 through an outflow path 510 provided by the outlet unit 500.

The movement path of the fluid is not limited as illustrated in FIG. 2 and as described with reference to FIG. 2 so that even though the fluid to be purified is introduced in an opposite direction to the movement direction of the fluid illustrated in FIG. 2, that is, through the outflow path 510, and is leaked through the inflow path 210, the double filter structure 10 may function as expected by the present disclosure. That is, the double filter structure 10 according to the present disclosure may be a filter structure which may be bi-directionally used. All the configurations illustrated in FIGS. 1 and 2 are not essential configurations, and some blocks connected to the double filter structure 10 may be added, changed, and deleted.

Figure 3:
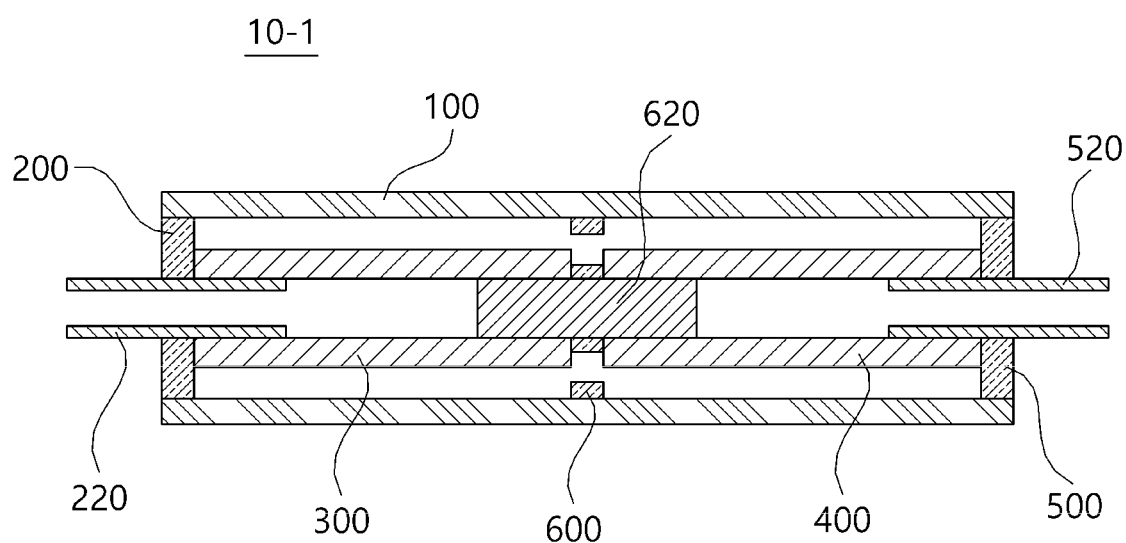
FIG. 3 is a diagram for explaining a configuration of a double filter structure according to another exemplary embodiment of the present disclosure.

FIG. 3 is a diagram for explaining a configuration of a double filter structure according to another exemplary embodiment of the present disclosure.

Figure 4:
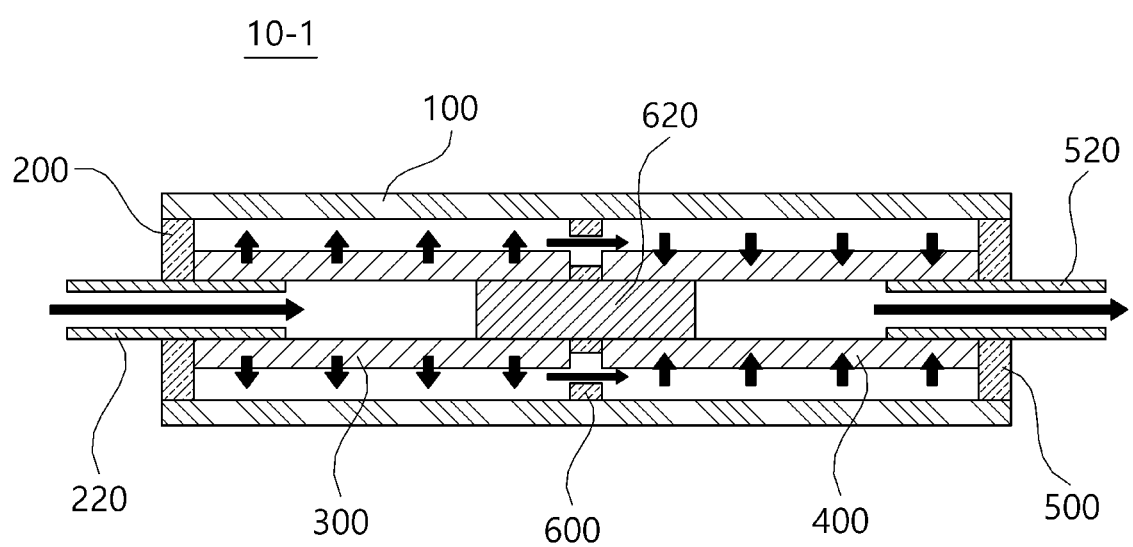
FIG. 4 is a view for explaining a flow of a fluid in a double filter structure of FIG. 3.

FIG. 4 is a view for explaining a flow of a fluid in a double filter structure of FIG. 3.

Figure 5:
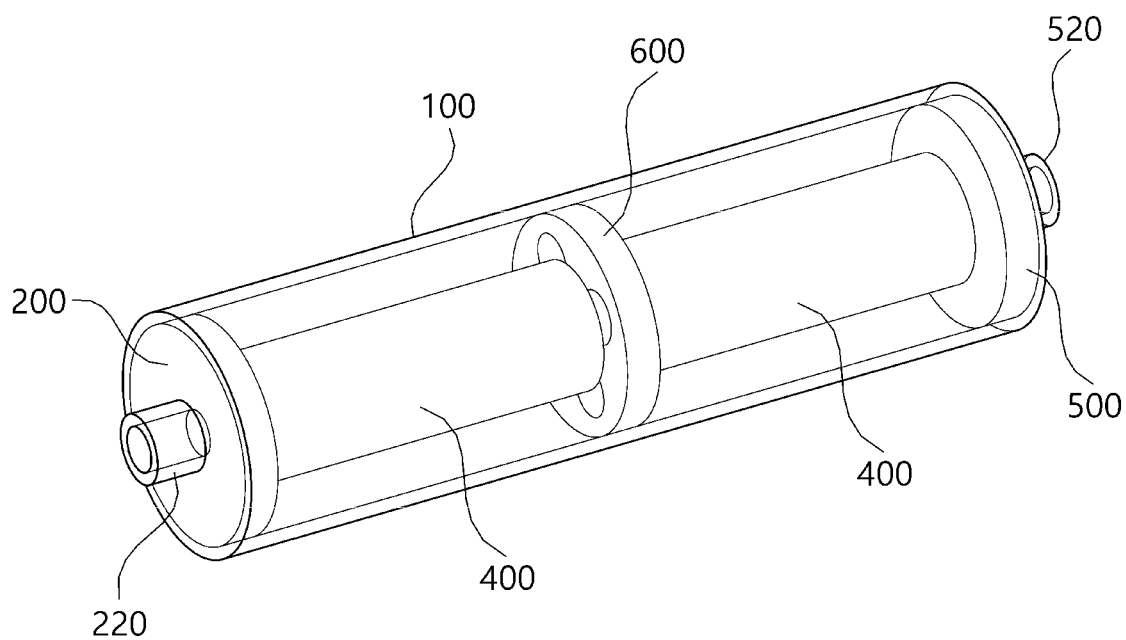
FIG. 5 is a perspective view of a double filter structure of FIG. 3.

FIG. 5 is a perspective view of a double filter structure of FIG. 3.

FIGS. 3 and 4 are views illustrating a cross-section which is horizontal to a longitudinal direction and is perpendicular to a width direction of the double filter structure 10-1 according to another exemplary embodiment of the present disclosure. Referring to FIG. 3, the first filter unit 300 may be provided with an empty space to penetrate in the longitudinal direction The second filter unit 400 may be provided with an empty space so as to penetrate the longitudinal direction.

The partition 600 includes a filter fixing protrusion 620 which is provided to be fitted into the empty spaces provided in the first filter unit 300 and the second filter unit 400 to fix the first filter unit 300 and the second filter unit 400 to the partition 600.

The filter fixing protrusion 620 may be coupled to penetrate the partition 600, or attached on a surface of the partition 600 which is directed to the first filter unit 300 to fix the first filter unit 300 to the partition 600, or attached on a surface of the partition 600 which is directed to the second filter unit 400 to fix the second filter unit 400 to the partition 600.

The inlet unit 200 includes a first path providing protrusion 220 which is provided with an empty space therein to penetrate in the length direction to provide a path through which the fluid is introduced into the inner space of the first filter unit 300 and at least partially fitted into the empty space provided in the first filter unit 300.

The first path providing protrusion 220 may be provided so as to at least partially protrude outwardly from the housing unit 100. As the first path providing protrusion 220 is provided so as to at least partially protrude outwardly from the housing unit 100, the double filter structure 10-1 is used to be coupled to a pipe or a hose through which the fluid to be purified is supplied. As the first path providing protrusion 220 is provided so as to at least partially protrude outwardly from the housing unit 100, the user may separate the inlet unit 200 by applying a force to the first path providing protrusion 220 to replace the first filter unit 300 located in the housing unit 100.

The outlet unit 500 includes a second path providing protrusion 520 which is provided with an empty space therein to penetrate in the length direction to provide a path through which the fluid is discharged from the inner space of the second filter unit 400 to the outside of the housing unit 100 and at least partially fitted into the empty space provided in the second filter unit 400.

The second path providing protrusion 520 may be provided so as to at least partially protrude toward the outside of the housing unit 100. As the second path providing protrusion 520 is provided so as to at least partially protrude outwardly from the housing unit 100, the double filter structure 10-1 is used to be coupled to a pipe or a hose which provides a path to discharge the fluid purified by the double filter structure 10-1. As the second path providing protrusion 520 is provided so as to at least partially protrude outwardly from the housing unit 100, the user may separate the outlet unit 500 by applying a force to the second path providing protrusion 520 to replace the second filter unit 400 located in the housing unit 100.

As the first filter unit 300 and the second filter unit 400 are replaced, the double filter structure 10-1 two different types of filters having different replacement cycles of the filters to increase the purification performance. For example, the HEPA filter is applied for the first filter unit 300 and the ceramic filter is applied to the second filter unit 400. Referring to FIGS. 3 to 5, the first filter unit 300 and the second filter unit 400 are formed to be thick in the width direction to cover at least a part of the through hole 610. By doing this, the flow is prevented from flowing to the center portion of the partition 600 to prevent the partition 600 from being deviated from a fixed position in the housing unit 100.

Referring to FIG. 4, the fluid to be purified may be introduced into the double filter structure 10-1 through the inflow path 210 provided by the inlet unit 200.

The fluid introduced through the inflow path 210 is sucked in the longitudinal direction of the first filter unit 300 to move to an empty space formed in the first filter unit 300 and then be discharged in the width direction to perform the primary purification.

The fluid discharged in the width direction of the first filter unit 300 may move to the space in which the second filter unit 400 is provided along the through holes 610-1 and 610-2 which are provided by the partition 600. Next, the fluid is sucked in the width direction of the second filter unit 400. After the fluid sucked in the width direction of the second filter unit 400 moves to the empty space formed in the second filter unit 400, the fluid is discharged in the longitudinal direction of the second filter unit 400 to perform the secondary purification.

The fluid discharged from the second filter unit 400 may be leaked to the outside of the double filter structure 10 through an outflow path 510 provided by the outlet unit 500.

The movement path of the fluid is not limited as illustrated in FIG. 4 and as described with reference to FIG. 4 so that even though the fluid to be purified is introduced in an opposite direction to the movement direction of the fluid illustrated in FIG. 4, that is, through the outflow path 510, and is leaked through the inflow path 210, the double filter structure 10-1 may function as expected by the present disclosure. That is, the double filter structure 10-1 according to the present disclosure may be a filter structure which may be bi-directionally used.

Figure 6:
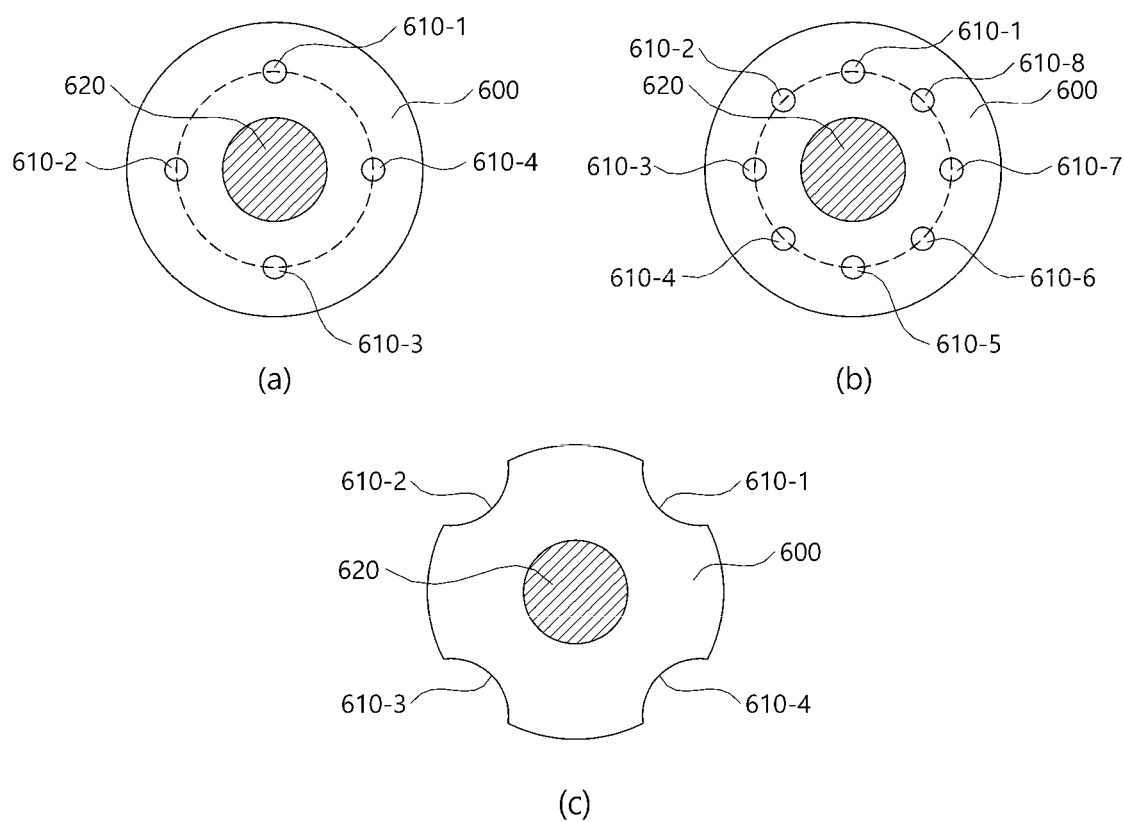
FIG. 6 is a diagram for explaining a partition according to various exemplary embodiments of the present disclosure.

All the configurations illustrated in FIGS. 3 and 5 are not essential configurations, and some blocks connected to the double filter structure 10-1 may be added, changed, and deleted, FIG. 6 is a diagram for explaining a partition according to various exemplary embodiments of the present disclosure.

Referring to FIGS. 6A and 6B, the partition 600 includes a plurality of through holes 610.

The plurality of through holes 610 may be provided to be spaced apart from each other along a circle having a diameter which is larger than the filter fixing protrusion 620 and is smaller than an internal circumferential surface of the housing unit 100.

The partition 600 may be in contact with the internal circumferential surface of the housing unit 100 without forming an empty space, but may provide the through hole 610 to provide a movement path of the fluid together with the inner circumferential surface of the housing unit 100.

Referring to FIG. 6C, when the partition 600 is fixed to the inner circumferential surface of the housing unit 100, the plurality of through holes 610-1, 610-2, 620-3, and 620-4 may be provided to be located between the inner circumferential surface of the partition 600 and the housing 100. In this case, a pressure applied to the partition 600 from the fluid which passes through the through holes 610-1, 610-2, 610-3, 610-4 is dispersed toward the inner circumferential surface of the housing unit 100 as compared with the through hole 610 is located only in the width as illustrated in FIGS. 6A and 6B and the partition 600, the first filter unit 300, and the second filter unit 400 are prevented from being deviated from the fixed location due to the pressure of the fluid.

Widths of the plurality of through holes 610 may be provided to be smaller than the widths of the inflow path 210 and the outflow path 510.

According to the exemplary embodiment of the present disclosure, a total of areas of the plurality of through holes 610 may be equal to or larger than a cross-sectional area of the filter fixing protrusion 610 in the width direction. When the total of the areas of the plurality of through holes 610 is smaller than the cross-sectional area of the filter fixing protrusion 610 in the width direction, since the flow rate of the fluid passing through the through hole 610 increases, the partition 600 which fixes the filter fixing protrusion 610 is deviated from the fixed position inside the housing 100. Therefore, the first filter unit 300 and the second filter unit 400 move away so that the double filter structure 10 cannot perform its own function.

For example, referring to FIG. 6A, when the filter fixing protrusion 610 is provided in a cylindrical shape, a diameter of a cross-section in the width direction of the filter fixing protrusion 610 is 10 mm, and all the plurality of through holes 610-1, 610-2, 610-3, and 610-4 is provided to have the same size and the same shape, the diameter of each of the through holes 610-1, 610-2, 610-3, and 610-4 may be provided to be 5 mm or smaller.

Figure 7:
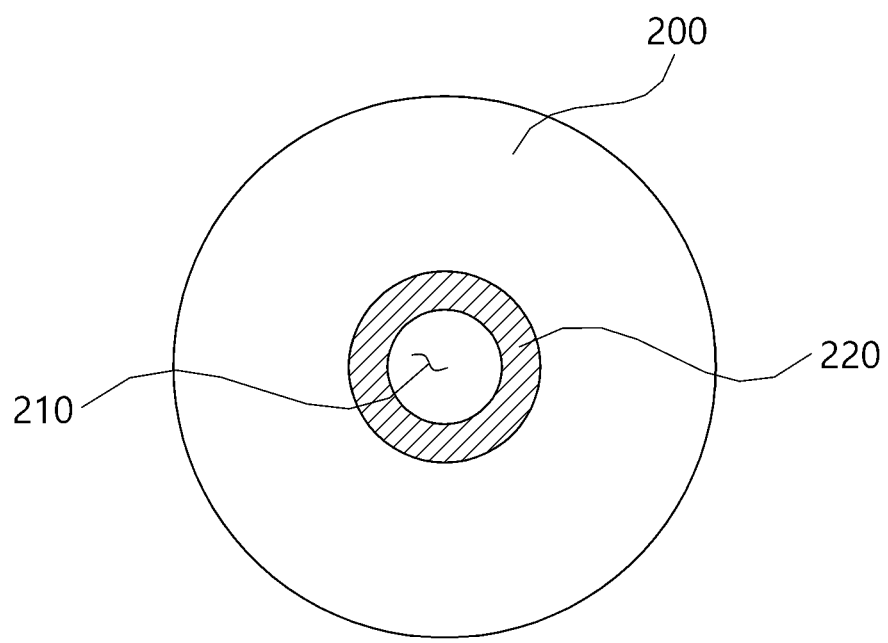
FIG. 7 is a view for explaining an inlet unit according to an exemplary embodiment of the present disclosure.

FIG. 7 is a view for explaining an inlet unit according to an exemplary embodiment of the present disclosure.

According to the exemplary embodiment of the present disclosure, as the housing unit 100 is implemented in the cylindrical shape to pass through the inner space, the inlet unit 200 is formed as illustrated in FIG. 7.

The outlet unit 500 may be formed to have the substantially same shape as the inlet unit 200.

As illustrated in FIG. 7, the first path providing protrusion 220 is provided to have a predetermined thickness to prevent the damage due to the pressure of the inflow fluid and the second path providing protrusion is provided to have a predetermined thickness to prevent the damage due to the pressure of the leaked fluid.

Figure 8:
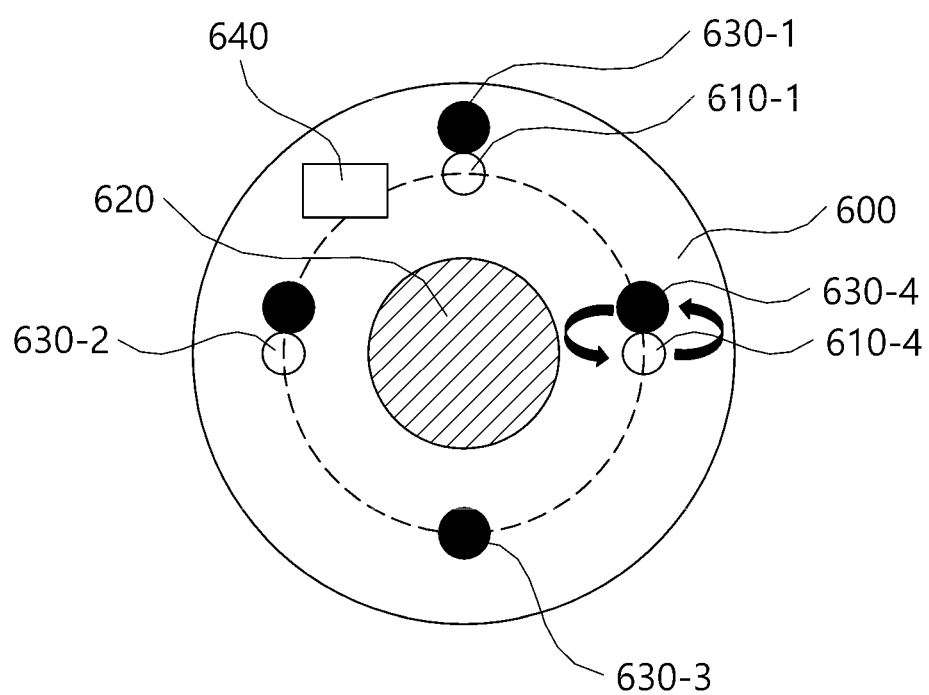
FIG. 8 is a view for explaining a through-hole cover according to an exemplary embodiment of the present disclosure.

FIG. 8 is a view for explaining a through-hole cover according to an exemplary embodiment of the present disclosure.

Referring to FIG. 8, the partition 600 includes through hole covers 630-1, 630-2, 630-3, and 630-4 and a flow rate sensing unit 640.

The through hole cover 630 may be provided to have a size to completely cover the through hole 610, but may also be provided to cover at least a part thereof. The through hole cover 630 is provided in the position which shares at least one point with the through hole 610 and as illustrated in FIG. 8, may open and close the through hole 610 by rotating with respect to the point shared with the through hole 610.

The through hole cover 630 may be rotatably fixed with a predetermined interval from the through hole 610. For example, the through hole cover 630 may be fixed to 1 to 1.5 mm above the through hole 610. In this case, the through hole cover 630 may be provided to have a diameter to be 1 to 1.5 mm larger than the through hole 610.

The through hole cover 630 may be provided so as to correspond to at least one through hole 610.

The through hole cover 630 is manipulated by a manipulation unit (not illustrated) located at the outside of the double filter structure 10 to be open and closed. The through hole cover 630 may further accompany various types of known power driving devices (for example, a motor) for performing opening and closing.

The flow rate sensing unit 640 may be a sensor which measures a speed of the fluid moving in the housing unit 100. As illustrated in FIG. 8, the flow rate sensing unit 640 may be attached to the partition 600, but is not necessarily limited thereto and may be fixed to the inner circumferential surface of the housing unit 100. However, the flow rate sensing unit may be located in an area in which the first filter unit 300 is located with respect to an area partitioned by the partition 600.

The through hole cover 630 may open and close the through hole 610 in response to the speed of the fluid sensed by the flow rate sensing unit 640.

When the speed of the fluid sensed by the flow rate sensing unit 640 corresponds to a first reference range (for example, to 1 mm/s) which is determined in advance, a predetermined reference number (for example, three) of through hole cover 630, among the plurality of through hole covers 630, may block the through hole 610. Referring to FIG. 8, only the through hole covers 630-1, 630-2, and 630-3 may block the through holes 610-1, 610-2, and 610-3.

When the speed of the fluid sensed by the flow rate sensing unit 640 corresponds to a second reference range (for example, 1 to 2 mm/s) which is determined in advance, a predetermined reference number (for example, two) of through hole cover 630, among the plurality of through hole covers 630, may block the through hole 610. Referring to FIG. 8, only the through hole covers 630-1 and 630-2 may block the through holes 610-1 and 610-2.

When the speed of the fluid sensed by the flow rate sensing unit 640 corresponds to a third reference range (for example, 2 to 3 mm/s) which is determined in advance, a predetermined reference number (for example, one) of through hole cover 630, among the plurality of through hole covers 630, may block the through hole 610. Referring to FIG. 8, only the through hole cover 630-1 may block the through hole 610-1.

When the speed of the fluid sensed by the flow rate sensing unit 640 corresponds to a fourth reference range (for example, 3 to 4 mm/s) which is determined in advance, a predetermined reference number (for example, 0) of through hole cover 630, among the plurality of through hole covers 630, may block the through hole 610. Referring to FIG. 8, all the through hole covers 630-1, 630-2, 630-3, and 630-4 may not block the through holes 610-1, 610-2, 610-3, and 610-4.

Even though it has been described above that all components of the exemplary embodiment of the present invention are combined as one component or operate to be combined, the present invention is not limited to the exemplary embodiment. In other words, one or more components may be selectively combined to be operated within a scope of the present invention.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. A double filter structure, comprising:
a housing unit extends a longitudinal direction to include an inner space;
an inlet unit which is located at an inlet side of the housing unit and provides an inflow path of a fluid;
a first filter unit which sucks fluid introduced from the inflow path in the longitudinal direction and discharges the sucked fluid to the width direction;
a second filter unit which sucks the discharged fluid in the width direction and discharges the fluid in the longitudinal direction;
a partition which connects the first filter unit and the second filter unit; and
an outlet unit which is located at an outlet side of the housing unit and provides an outflow path of the fluid discharged from the second filer unit,
wherein the partition is fixed to an inner circumferential surface of the housing unit to divide the inner space of the housing unit into a space in which the first filter unit is located and a space in which the second filter unit is located and includes a plurality of through holes to provide movement paths through which the fluid discharged from the first filter unit is introduced into the second filter unit, and
wherein the partition further includes a plurality of through hole covers respectively corresponding to the plurality of through holes, and each of the plurality of through hole covers is configured to open and close each of the corresponding plurality of through holes.

2. The double filter structure according to claim 1, wherein the first filter unit and the second filter unit are provided with empty spaces therein to penetrate in the longitudinal direction.

3. The double filter structure according to claim 2, wherein the partition includes a filter fixing protrusion which is provided to be fitted into the empty spaces provided in the first filter unit and the second filter unit to fix the first filter unit and the second filter unit to the partition.

4. The double filter structure according to claim 3, wherein the plurality of through holes are spaced apart from each other along a circle having a diameter which is larger than a diameter of the filter fixing protrusion and smaller than a diameter of the inner circumferential surface of the housing unit.

5. The double filter structure according to claim 2, wherein the inlet unit includes a first path providing protrusion which is provided with an empty space therein to penetrate in the length direction to provide a path through which the fluid is introduced into the inner space of the first filter unit and is at least partially fitted into the empty space provided in the first filter unit.

6. The double filter structure according to claim 5, wherein the first path providing protrusion is provided to at least partially protrude outwardly from the housing unit.

7. The double filter structure according to claim 2, wherein the outlet unit includes a second path providing protrusion which is provided with an empty space therein to penetrate in the length direction to provide a path through which the fluid is leaked from the inner space of the second filter unit to the outside of the housing unit and is at least partially fitted into the empty space provided in the second filter unit.

8. The double filter structure according to claim 1, wherein the through hole cover is provided to correspond to at least one through hole.

9. The double filter structure according to claim 1, wherein each of the plurality of through hole covers is larger than the size of each of the plurality of through holes, is rotatably fixed to the partition, and rotates in a fixed position to open and close each of the plurality of through holes.

10. The double filter structure according to claim 1, wherein the first filter unit and the second filter unit are any one of a HEPA filter, a ceramic filter, a nano-fiber filter, or a polymer filter.

11. The double filter structure according to claim 1, wherein the housing unit is formed of a material of any one of a polymer compound or metal.

* * * * *